(12) United States Patent
Andree

(10) Patent No.: US 12,315,675 B2
(45) Date of Patent: May 27, 2025

(54) HOUSING FOR CHIP FORM ULTRACAPACITOR

(71) Applicant: FastCap Ultracapacitors LLC, Woburn, MA (US)

(72) Inventor: Wyatt Andree, Revere, MA (US)

(73) Assignee: FASTCAP ULTRACAPACITORS LLC, Woburn, MA (US)

( * ) Notice: Subject to any disclaimer, the term of this patent is extended or adjusted under 35 U.S.C. 154(b) by 53 days.

(21) Appl. No.: 17/928,846

(22) PCT Filed: Jun. 2, 2021

(86) PCT No.: PCT/US2021/035385
§ 371 (c)(1),
(2) Date: Nov. 30, 2022

(87) PCT Pub. No.: WO2021/247658
PCT Pub. Date: Dec. 9, 2021

(65) Prior Publication Data
US 2023/0215665 A1 Jul. 6, 2023

Related U.S. Application Data

(60) Provisional application No. 63/033,371, filed on Jun. 2, 2020.

(51) Int. Cl.
H01G 11/82 (2013.01)
H01G 2/06 (2006.01)
(Continued)

(52) U.S. Cl.
CPC ............ *H01G 11/82* (2013.01); *H01G 2/06* (2013.01); *H01G 11/08* (2013.01); *H01G 11/74* (2013.01); *H01G 11/80* (2013.01)

(58) Field of Classification Search
CPC .......... H01G 11/82; H01G 2/06; H01G 11/08; H01G 11/74; H01G 11/80
(Continued)

(56) References Cited

U.S. PATENT DOCUMENTS 6,445,566 B2   9/2002   Watanabe et al.
8,310,812 B2   11/2012  Ashizaki et al.
(Continued)

FOREIGN PATENT DOCUMENTS

EP   2952377 A1   12/2015
JP   2002368426 A  12/2002
(Continued)

OTHER PUBLICATIONS

International Search Report with Written Opinion for International Application No. PCT/US2021/035385; Application Filing Date Jun. 2, 2021; Date of Mailing Sep. 9, 2021 (7 pages).
(Continued)

Primary Examiner — Arun Ramaswamy

(57) ABSTRACT

Disclosed herein is an energy storage apparatus suitable for mounting on a printed circuit board using a solder reflow process, the apparatus comprising a sealed housing body comprising a positive internal contact and a negative internal contact each disposed within the body and each respectively in electrical communication with a positive external contact and a negative external contact, each of the external contacts providing electrical communication to the exterior of the body; an electric double layer capacitor (EDLC) energy storage cell disposed within a cavity in the body comprising a stack of alternating electrode layers and electrically insulating separator layers; an electrolyte disposed within the cavity and wetting the electrode layers; a positive lead electrically connecting a first group of one or more of the electrode layers to the positive internal contact; and a
(Continued)

negative lead electrically connecting a second group of one or more of the electrode layers to the negative internal contact; wherein at least one of the positive external contact and the negative external contact is configured with an elongated exterior terminal configured to dissipate thermal shock to the energy storage apparatus.

7 Claims, 9 Drawing Sheets

(51) Int. Cl.
  *H01G 11/08* (2013.01)
  *H01G 11/74* (2013.01)
  *H01G 11/80* (2013.01)
(58) Field of Classification Search
  USPC .................. 361/502, 503, 508, 516, 517
  See application file for complete search history.

(56) References Cited

U.S. PATENT DOCUMENTS

| | | |
|---|---|---|
| 11,250,996 B2 | 2/2022 | Brambilla et al. |
| 2003/0007316 A1 | 1/2003 | Takasugi et al. |
| 2010/0053927 A1* | 3/2010 | Inoue ...................... H01G 9/28 |
| | | 361/328 |
| 2010/0188800 A1 | 7/2010 | Ashizaki et al. |
| 2011/0085283 A1* | 4/2011 | Park ....................... H01G 11/74 |
| | | 29/25.03 |
| 2011/0317331 A1 | 12/2011 | Lee et al. |
| 2012/0019983 A1* | 1/2012 | Tamachi ................ H01G 11/78 |
| | | 29/25.41 |
| 2012/0050946 A1 | 3/2012 | Ra et al. |
| 2013/0280569 A1* | 10/2013 | Mori ...................... H01G 11/80 |
| | | 429/94 |
| 2018/0144878 A1 | 5/2018 | Ritter et al. |
| 2019/0115638 A1 | 4/2019 | Chen et al. |

FOREIGN PATENT DOCUMENTS

| | | |
|---|---|---|
| JP | 2008160032 A | 7/2008 |
| JP | 2010073712 A | 4/2010 |
| JP | 2010245221 A | 10/2010 |
| KR | 20170004737 A | 1/2017 |
| WO | 2012141191 A1 | 10/2012 |
| WO | 2019070897 A1 | 4/2019 |

OTHER PUBLICATIONS

Office Action in counterpart Japanese Patent Application No. 2022-574284; Date of Mailing: Feb. 4, 2025, 8 pages total including English translation.

Supplementary European Search Report for the corresponding European Application No. 21818760, Date of Completion: Mar. 11, 2025; 11 pages.

* cited by examiner

HOUSING FOR CHIP FORM ULTRACAPACITOR

CROSS REFERENCE TO RELATED APPLICATIONS

This application is a National Stage application of PCT/US2021/035385, filed Jun. 2, 2021, which claims the benefit of U.S. Provisional Application No. 63/033,371, filed Jun. 2, 2020, both of which are incorporated by reference in their entirety herein.

BACKGROUND OF THE INVENTION

1. Field of the Invention

The invention disclosed herein relates to energy storage devices and, in particular, to an ultracapacitor configured for mounting to an electrical circuit board.

2. Description of the Related Art

A myriad of devices make use of electronics having components disposed onto circuit boards. As with all electronics, an effective power supply is a requirement for powering the components. One technique for providing local power on a circuit board involves the use of energy storage devices, such as batteries and capacitors.

Generally, conventional capacitors provide less than about 360 Joules per kilogram of specific energy, whereas a conventional alkaline battery has a density of about 590 kJ/kg. Ultracapacitors (also referred to as "supercapacitors"), can accept and deliver charge much faster than batteries and tolerate many more charge and discharge cycles than rechargeable batteries. This makes implementation of ultracapacitors an attractive solution for electrical engineers.

As first design obstacle is that typical ultracapacitors can be substantially larger than conventional batteries for a given charge. Even with advancements in power density, another problem is process oriented. That is, assembly of an electrical circuit requires soldering of components to a circuit board. This "reflow process" generates heat that is substantial enough to degrade or destroy conventional ultracapacitors. Thus, while use of an ultracapacitor may be an attractive solution for powering electronics mounted on a circuit board, this solution has not been available to compact designs requiring high power output. Beyond that, a further problem with existing ultracapacitor technology is the limited lifetime of such components.

What are needed are ultracapacitors that are useful for powering electrical components disposed on a circuit board. Preferably, the ultracapacitors offer a compact design that is suited to the ever-shrinking size of the components, are capable of surviving reflow processing and provide a useful lifetime of operation.

SUMMARY

Additional aspects and embodiments of the chip form ultracapacitor are described herein.

Disclosed herein is an energy storage apparatus suitable for mounting on a printed circuit board using a solder reflow process, the apparatus comprising a sealed housing body comprising a positive internal contact and a negative internal contact each disposed within the body and each respectively in electrical communication with a positive external contact and a negative external contact, each of the external contacts providing electrical communication to the exterior of the body; an electric double layer capacitor (EDLC) energy storage cell disposed within a cavity in the body comprising a stack of alternating electrode layers and electrically insulating separator layers; an electrolyte disposed within the cavity and wetting the electrode layers; a positive lead electrically connecting a first group of one or more of the electrode layers to the positive internal contact; and a negative lead electrically connecting a second group of one or more of the electrode layers to the negative internal contact; wherein at least one of the positive external contact and the negative external contact is configured with an elongated exterior terminal configured to dissipate thermal shock to the energy storage apparatus.

Various embodiments may include any of the features and elements described herein, either alone or in any suitable combination.

BRIEF DESCRIPTION OF THE DRAWINGS

The features and advantages of the invention are apparent from the following description taken in conjunction with the accompanying drawings in which.

DETAILED DESCRIPTION

Disclosed herein is an energy storage device useful for providing energy to a circuit board. Generally, the energy storage device, referred to as a "chip cap," is a specialized ultracapacitor configured in a form factor suited for surface mounting to the circuit board. Advantageously, the chip cap is capable of withstanding the demands associated with manufacture and assembly of board mounted circuits and subsequently delivering superior performance over prior art energy storage devices.

This application is related to and continues the technology disclosed in earlier filed provisional application 62/567,752, entitled "Chip Ultracapacitor" which was filed on Oct. 3, 2017, as well as International Patent Application PCT/US2018/054231, filed 3 Oct. 2018, entitled "Chip Form Ultracapacitor," the disclosures of which are incorporated by reference herein in their entirety for any purpose whatsoever.

In this application, aspects of additional embodiments are presented. Among other things, the additional aspects result in superior dissipation of thermal stress during installation of the chip cap. Generally, by employing aspects such as a thinner ceramic package, the reflowable ultracapacitor will be compatible with high performance SSD cards and other electronics with stringent design requirements.

There are several advantages of the form factors disclosed herein. For example, as the electronics market moves to ever thinner circuit boards, having a component design that is suited to such implementations, the chip cap is compatible with new design and fabrication techniques. Additionally, the external pad design provided increases the solderable area, thus improving performance in view of large temperature changes and without damage of the package, solder or substrate. Further, the internal via design using an internal bus bar and staggered vias gives the package a low total equivalent series resistance. Finally, the internal pads are located on a raised shelf at half the height of the cavity which facilitates manufacture helps to protect the pads from corrosion.

Figure 1:
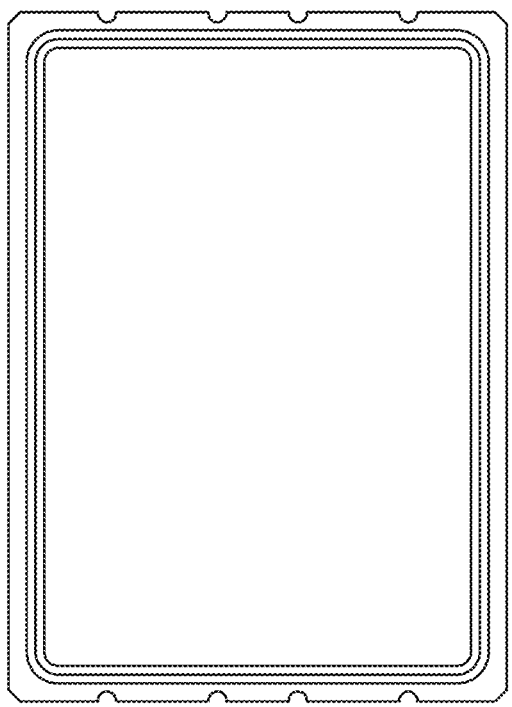
FIG. 1 is top-down view of comparative embodiments of the ultracapacitor disclosed herein.
Figure 1:
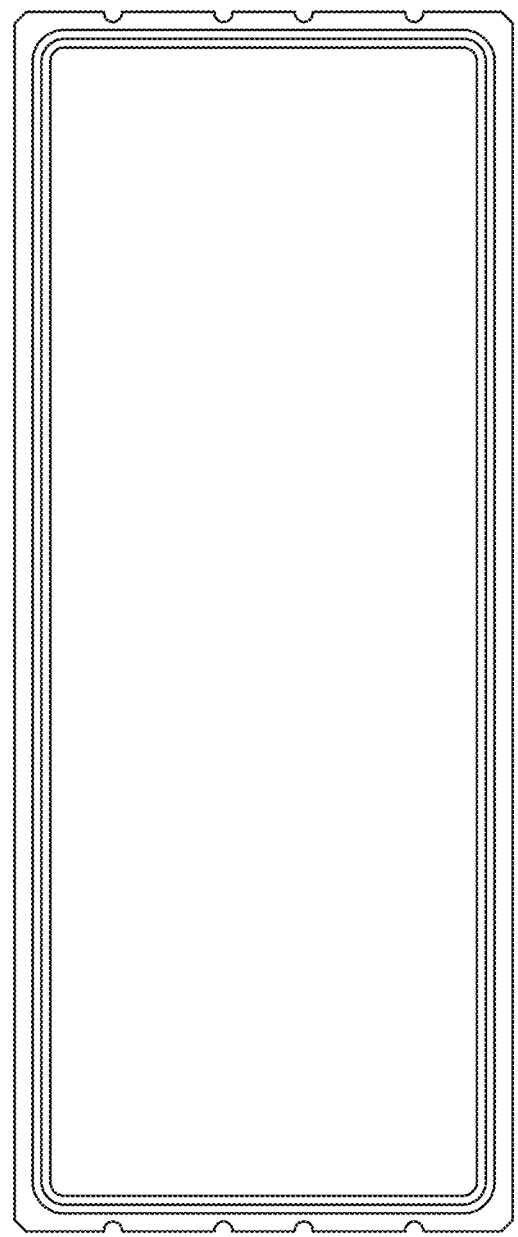

FIG. 1 depicts a "low profile" embodiment of the chip cap described in PCT/US2018/054231. In the PCT reference, exterior dimensions of the chip cap are approximately 8 mm (width)×11 mm (length). Also shown in FIG. 1 is a "low profile" embodiment of the chip cap device. In this example, exterior dimensions of the low-profile chip cap are approximately 9 mm (width)×22 mm (length).

Figure 2:
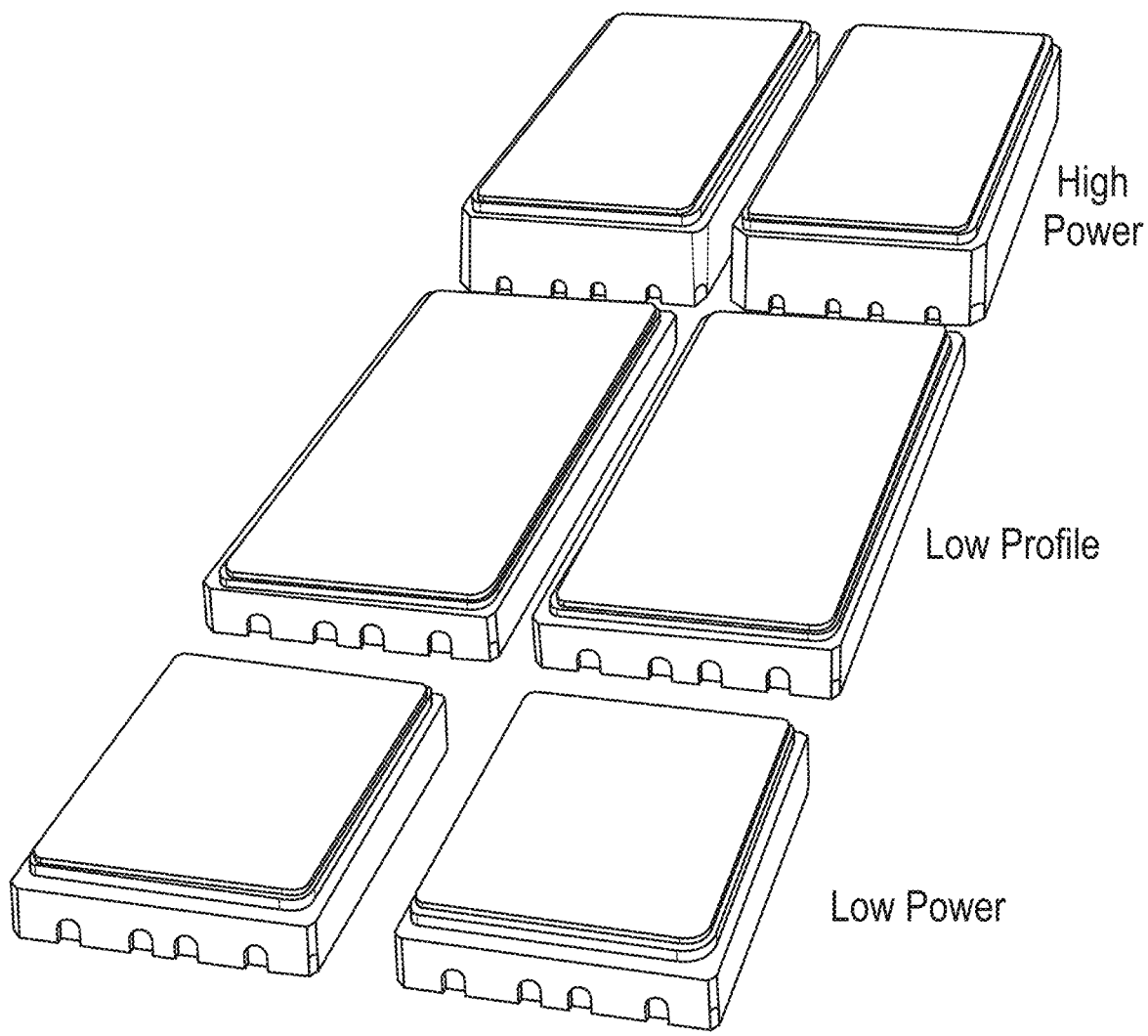
FIG. 2 is an isometric view depicting comparative embodiments of the chip cap according to the teachings herein.

Since capacitance of an energy storage cell is directly proportional to surface area of the electrode, the larger, low-profile cell is about double the capacitance of the smaller cell (for convenience, the initial embodiment is referred to as a "standard cell"). Although the low-profile cell is thinner, the low-profile cell is wider which results in better volume utilization over the standard cell. An additional embodiment, a "high-power" version is depicted in FIG. 2. As may be seen in FIG. 2, the high-power capacitor may be substantially higher or taller than the low profile or low power embodiments.

Figure 3:
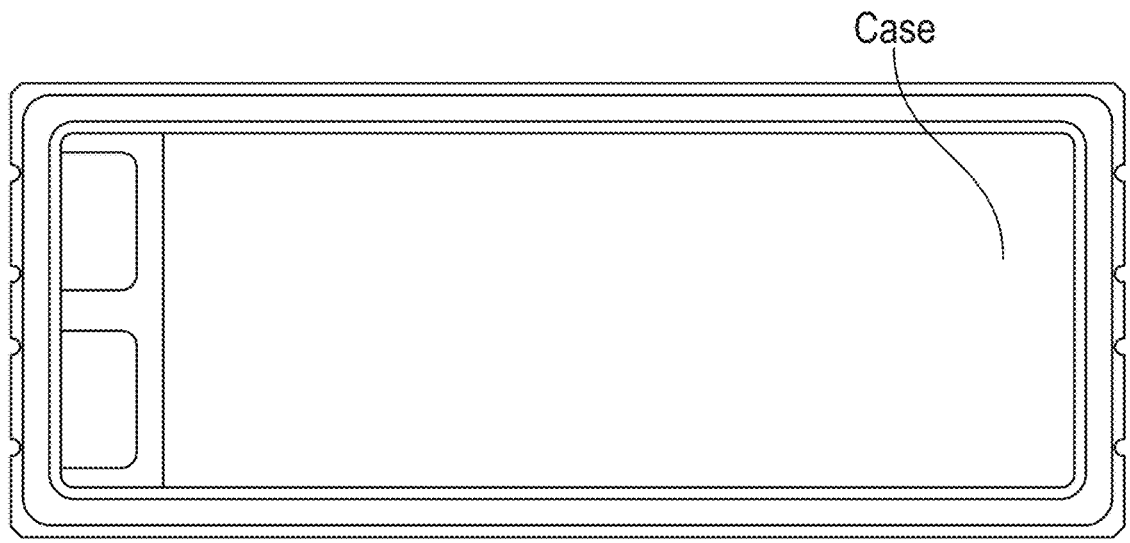
FIG. 3 is top-down view of the package, body or case for the chip capacitor. In this embodiment, the package is for a low profile design as shown in FIG. 2.

FIGS. 3 through 7 are illustrations depicting aspects of the housing (also referred to as a "body," "case," "package," and by other similar terms). FIG. 3 depicts a top down view of the case and reveals a device that is substantially similar to the body 101 shown in FIG. 7 of PCT/US2018/054231. In fact, the case of FIGS. 3 through 7 herein is substantially similar to the body 101 of the reference, with additional aspects being set forth herein.

Figure 4:
FIG. 4 is a bottom-up view of the package shown in FIG. 3

An example of another embodiment of the body 101 is set forth in FIG. 4 herein. In this example, a bottom side of the case depicted in FIG. 3 is shown. In this illustration, the case includes three contacts (or "terminals") that extend along a length of the case. The contacts include a positive contact (i.e., pad) separated from a negative contact (i.e., pad) by a dummy contact (i.e., pad). As shown in FIG. 4, one of the contacts may include a feature such as indicia (see the positive pad) which may be used to provide a visual indicator of polarity. The pad design provides for superior dissipation and management of thermal stress during the reflow process and also during high temperature operation.

Figure 5:
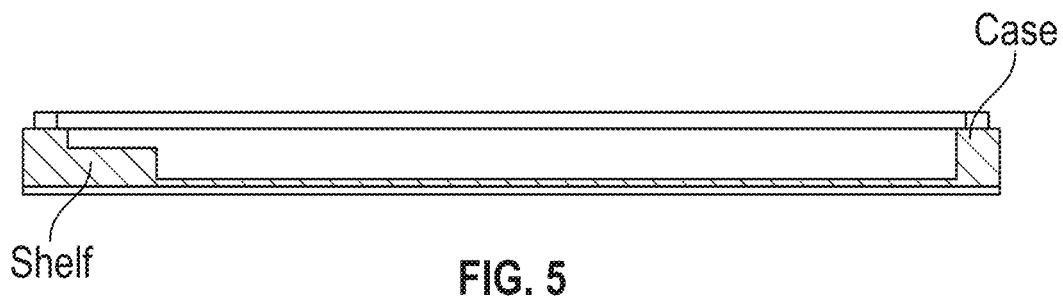
FIG. 5 is a cutaway side view of the package shown in FIGS. 3 and 4.

Turning to FIG. 5, a cutaway side view of the case is shown. In this illustration, the case includes a shelf. The shelf provides for elevated internal contacts. Thus, electrical leads of the storage cell (not shown here, but illustrated in PCT/US2018/054231) mount to an elevated portion of the case that is raised from the internal floor of the case. This design facilitates manufacture of the chip cap by simplifying welding evolutions, reduces internal corrosion by reducing exposure to electrolyte, and provides additional room within the case for the electrical network (see FIG. 7). An exploded view of the cutaway diagram is provided in FIG. 6. In some embodiments, the shelf includes a lip or collar (not shown) surrounding each internal contact. The collar may be designed within the ceramic material used to form the body. Generally, the collar may be included to ensure electrical separation of the two internal contacts (i.e., containment of weld materials during the weld process) and may also limit exposure of the internal contacts to electrolyte once the chip cap is in use.

Figure 6:
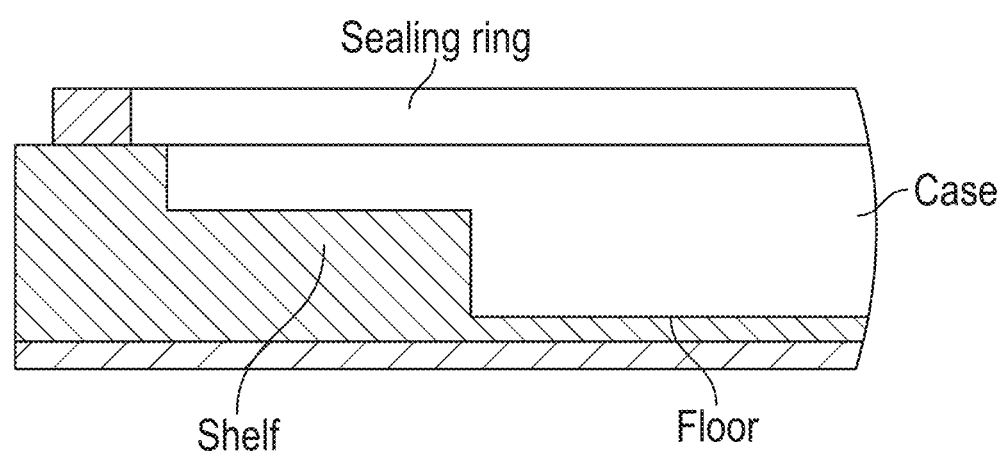
FIG. 6 is an exploded view of a portion of the depiction in FIG. 5
Figure 7:
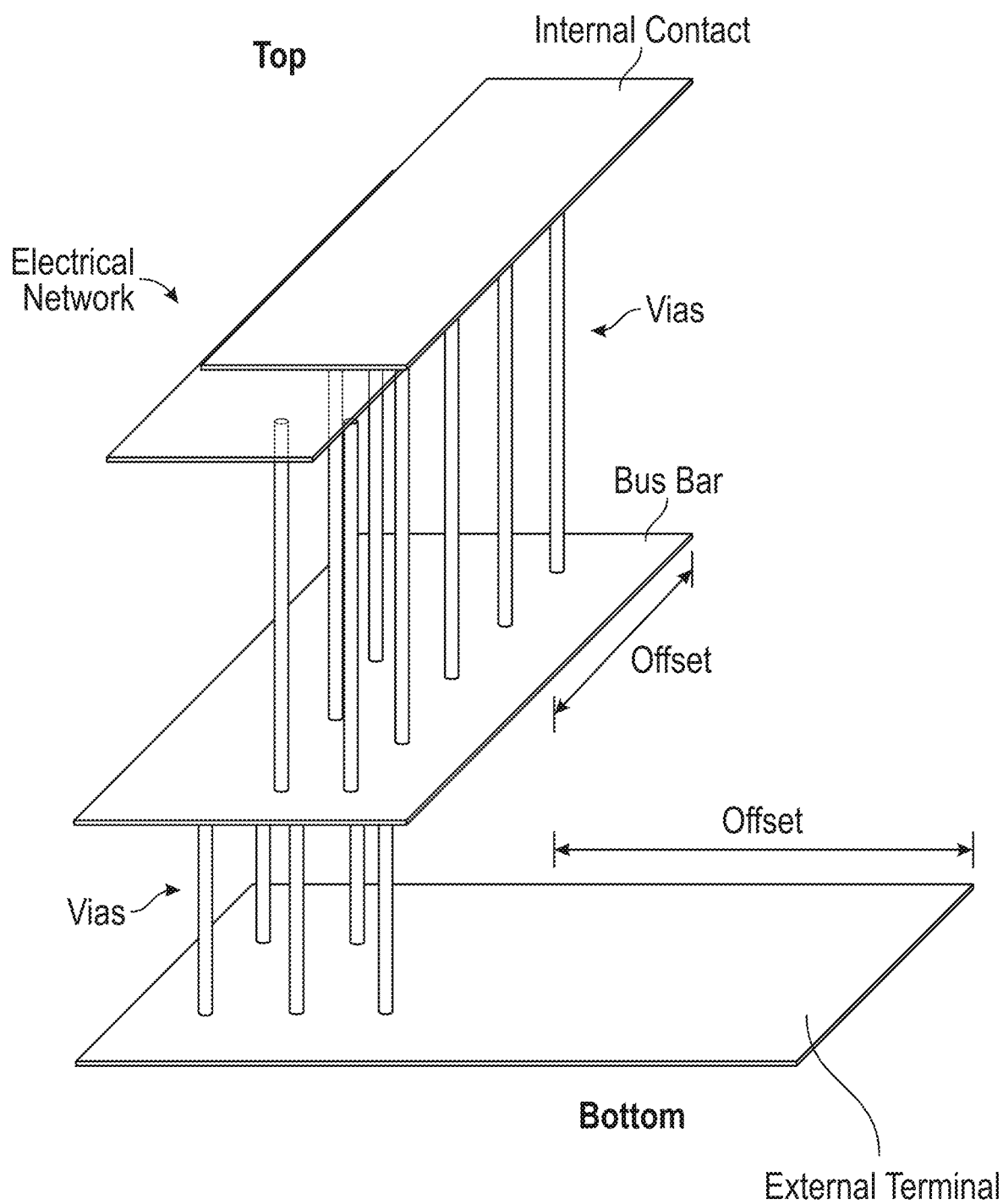
FIG. 7 is a graphic depicting internal electrical conduits for the package of FIGS. 1 through 6.
Figure 8:
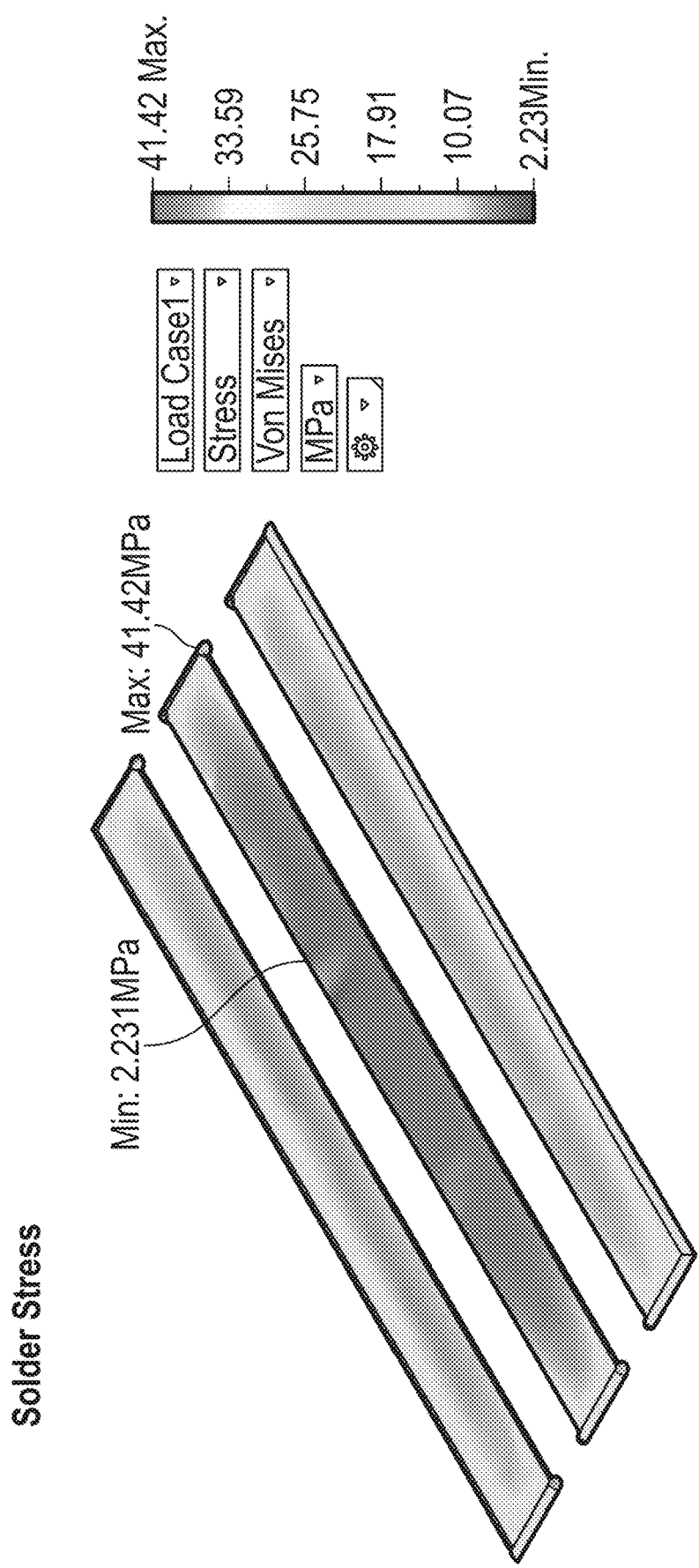
FIGS. 8 through 11 are graphic depictions of thermal stress within the package for reflow processing.
Figure 9:
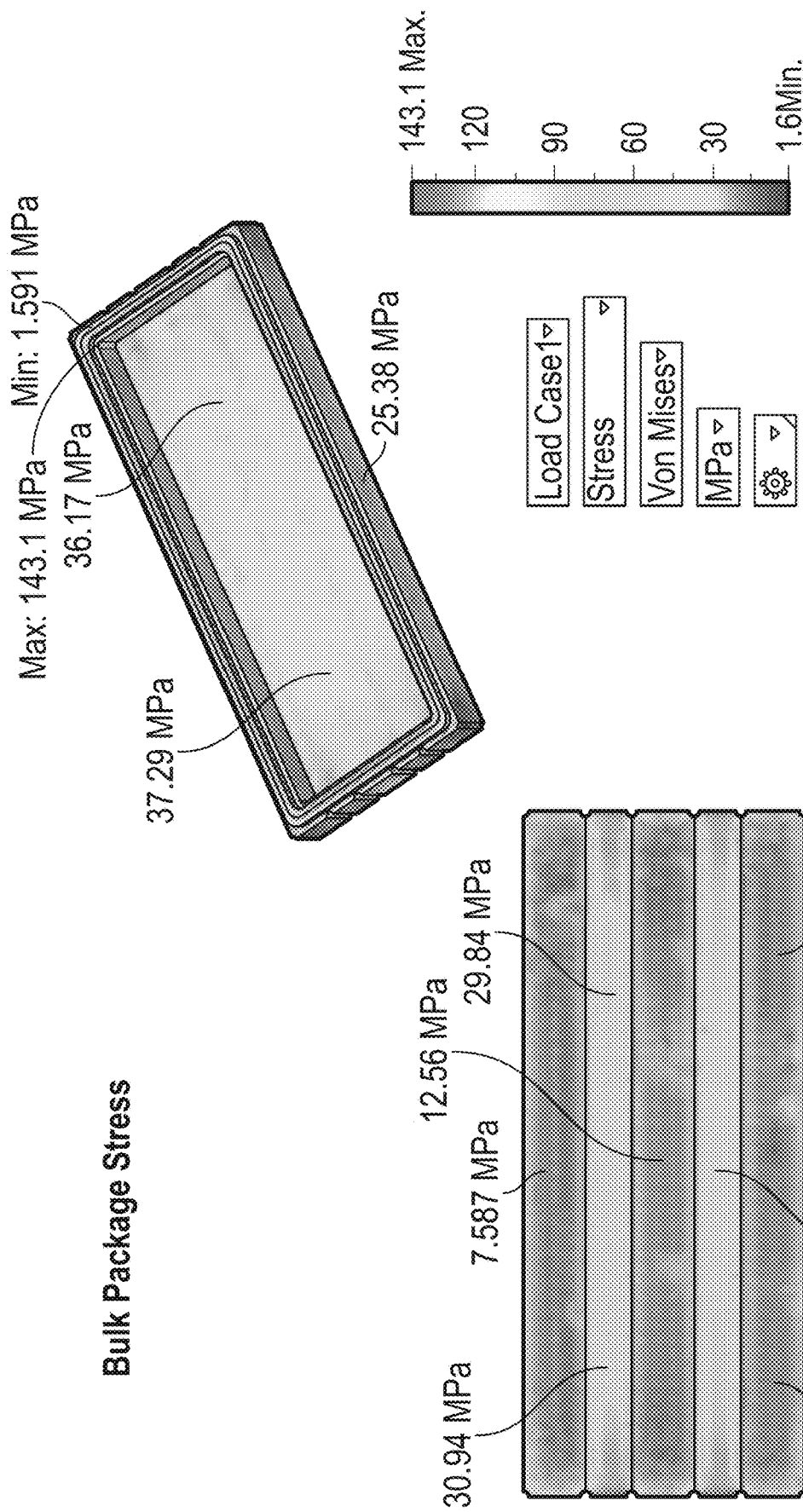
Figure 10:
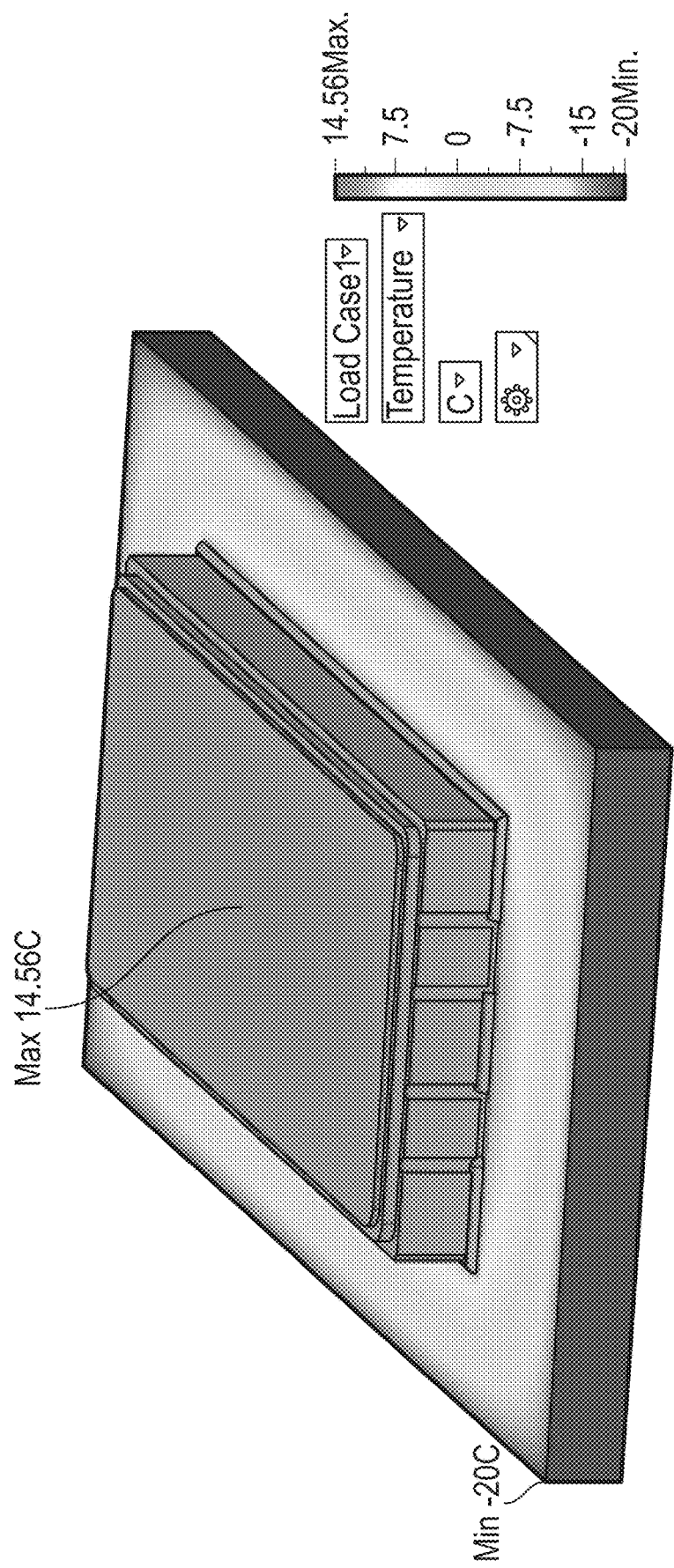
Figure 11:
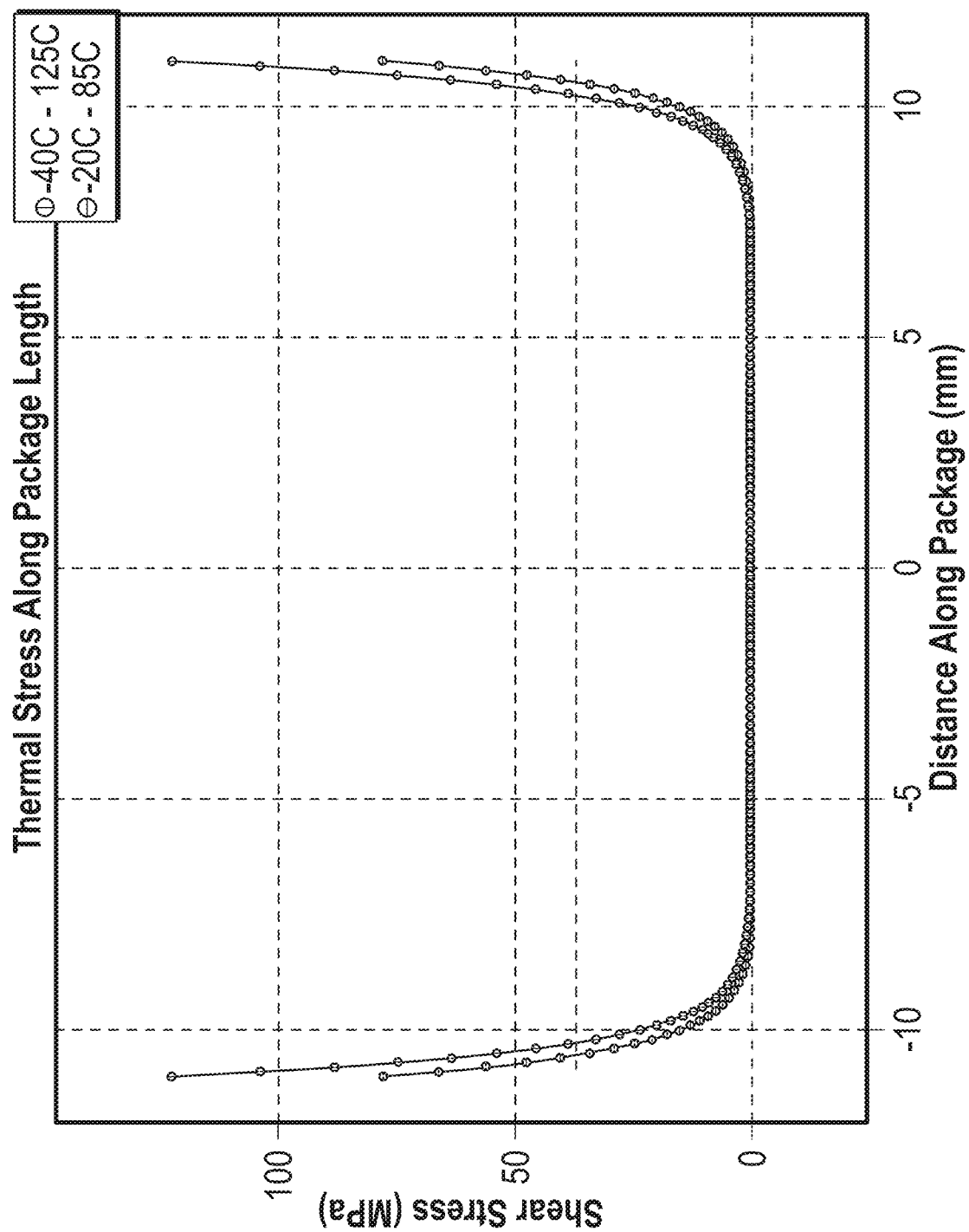

In FIG. 7, aspects of an electrical network are shown. Generally, the electrical network includes the internal contacts which are exposed within the case. The internal contacts may be disposed on the shelf as shown in FIGS. 5 and 6. As illustrated in FIGS. 4 (and 8) the external pads (i.e., electrical contacts) are offset from and electrically connected to the internal contacts by an intermediate circuit element. As discussed herein, the "offset" is with reference to a lateral offset of the internal contacts from a position of the external terminals. While some overlap may occur (if viewing from the top downward), at least a portion of the internal contacts and/or exterior terminals are not in topwise alignment, and therefore, offset from each other.

The intermediate element includes a plurality of vias that are connected to an intermediate bus, which is in-turn, connected to another plurality of vias. The offset arrangement of the intermediate circuit element is such that heat (such as from reflow processing) is substantially uniformly distributed throughout the case.

In addition to providing ample contact surface, the external pads are configured to dissipate heat during the reflow process, thereby limiting impact to the storage cell and electrolyte within the case.

In the design depicted, configuration of the external pads permits the package to withstand temperature fluctuations of over 100° C. without cracking or damaging the solder. FIGS. 8 through 11 depict results of modeling of the thermal processing.

Having thus introduced embodiments of an energy storage device for powering electrical circuits, some additional aspects are now presented.

A variety of form factors may be realized for a surface mount, reflow capable chip form ultracapacitor (or simply "chip cap"). The chip cap may be dimensionally configured to improve capacitance or other performance aspects, such as thermal transfer during reflow processing. Elongated electrical contacts may be configured for thermal stress management. At least one electrical contact may be configured with indicia. The indicia may be useful to indicate, for example, polarity of the chip cap.

The adaptable design of the chip cap makes the device particularly useful in solid state devices as the chip cap survives the reflow process well. Internet of Things (IoT) technologies can benefit from use of the chip cap due at least in part to the form factor of the chip cap. The electrical properties of the chip cap make the device well suited as a device for tracking charge (or "coulomb counting") in a battery pack or similar device. In the automotive industry, use of the chip cap is advantageous as the chip cap has substantial operational availability at high temperatures and in extreme environments. For example, the chip cap may be used to augment/support control bus operation. The high temperature survivability of the chip cap makes the device very well suited to use in medical devices subject to high-temperature sterilization processes.

In some embodiments, the chip cap includes a case with a shelf. The shelf may include a lip or collar. The collar may be adapted for use as barrier during welding and/or adapted to limit exposure to electrolyte. The chip cap may be fabricated with elongated exterior contact pads with a length and a width that is adapted for thermal stress management. In some embodiments, the elongated pads run the length of the case. In some embodiments, a dummy pad (or terminal) is included. The dummy terminal may also be adapted for thermal stress management. Configuration of the terminals for thermal stress management may include thermal stress modeling and may model performance during assembly of devices as well as subsequent operation. The chip cap may include an electrical network that exhibits internal contacts that are at least partially laterally offset from a position of exterior terminals. The electrical network may include a bus bar. The bus bar may be configured for thermal stress management. A plurality of conductors in vias may extend from the internal contacts to the bus bar, and another plurality of conductors in vias may extend from the bus bar to the exterior terminals.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party.

The appended claims or claim elements should not be construed to invoke 35 U.S.C. § 112(f) unless the words "means for" or "step for" are explicitly used in the particular claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An energy storage apparatus suitable for mounting on a printed circuit board using a solder reflow process, the apparatus comprising:

a sealed housing body comprising a positive internal contact and a negative internal contact each disposed within the body and each respectively in electrical communication with a positive external contact and a negative external contact, each of the external contacts providing electrical communication to the exterior of the body;

an electric double layer capacitor (EDLC) energy storage cell disposed within a cavity in the body comprising a stack of alternating electrode layers and electrically insulating separator layers;

an electrolyte disposed within the cavity and wetting the electrode layers;

a positive lead electrically connecting a first group of one or more of the electrode layers to the positive internal contact; and a negative lead electrically connecting a second group of one or more of the electrode layers to the negative internal contact;

wherein at least one of the positive external contact and the negative external contact is configured with an elongated exterior terminal configured to dissipate thermal shock to the energy storage apparatus; wherein the elongated exterior terminal is a pad extending along a length of the body.

2. The apparatus of claim 1, further comprising a shelf disposed within the housing body, the shelf elevating the positive internal contact and the negative internal contact from an internal floor of the housing body.

3. The apparatus of claim 1, wherein at least one of the positive internal contact and the negative internal contact is offset from the corresponding positive external contact and negative external contact.

4. The apparatus of claim 1, comprising at least one of: a bus bar for connecting the positive internal contact with the negative external contact negative; and another bus bar for connecting the negative internal contact with the negative external contact.

5. The apparatus of claim 1, wherein the positive external contact and the negative external contact are each configured with a separate elongated pad extending along a length of the body and wherein the negative external contact and the positive external contact are separated by an external elongated dummy contact pad extending along a length of the body parallel to the elongated pad of the positive external contact and the elongated pad of the negative external contact.

6. The apparatus of claim 5, wherein at least one of the elongated pad of the positive external contact, the negative external contact and the external dummy contact pad extends the entire length of the body, which is a case.

7. The apparatus of claim 5, wherein at least one of the positive external contact and the negative external contact includes an indicia configured to provide a visual indicator of polarity.

* * * * *